United States Patent
Itagaki et al.

(10) Patent No.: US 10,025,507 B2
(45) Date of Patent: Jul. 17, 2018

(54) METHOD OF WRITING FILE ONTO TAPE

(71) Applicant: International Business Machines Corporation, Armonk, NY (US)

(72) Inventors: Hiroshi Itagaki, Kanagawa-ken (JP); Tsuyoshi Miyamura, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/702,191

(22) Filed: May 1, 2015

(65) Prior Publication Data

US 2015/0363119 A1 Dec. 17, 2015

(30) Foreign Application Priority Data

Jun. 17, 2014 (JP) .................................. 2014-124161

(51) Int. Cl.
*G11B 20/12* (2006.01)
*G06F 3/06* (2006.01)
*G11B 27/10* (2006.01)

(52) U.S. Cl.
CPC .......... *G06F 3/0613* (2013.01); *G06F 3/0643* (2013.01); *G06F 3/0682* (2013.01); *G11B 27/10* (2013.01)

(58) Field of Classification Search
None
See application file for complete search history.

(56) References Cited

U.S. PATENT DOCUMENTS 9,063,666 B2 * 6/2015 Amir ..................... G06F 3/0611

FOREIGN PATENT DOCUMENTS

| JP | 06191626 A | 7/1994 |
| JP | 2003015941 A | 1/2003 |
| JP | 2007024378 A | 2/2007 |
| JP | 2011017642 A | 1/2011 |

OTHER PUBLICATIONS

"Linear Tape File System (LTFS) Format Specification", Version 2.2.0, SNIA Advancing storage & information technology, Dec. 21, 2013, <http://www.snia.org/tech_activities/standards/curr_standards/ltfs>.
"ZIP", the free encyclopedia"Wikipedia", downloaded on Mar. 15, 2015, <http://translate.google.com/translate?hl=en&sl=ja&u=http://ja.wikipedia.org/wiki/ZIP&prev=search>.
Japanese Patent Application Serial No. 2014124161 filed Jun. 17, 2014.

* cited by examiner

*Primary Examiner* — K. Wong
(74) *Attorney, Agent, or Firm* — Christopher McLane; Maeve M. Carpenter (57) ABSTRACT

An approach to reducing overhead to enable high-speed writing even when a large number of small-sized files are written onto a tape in a file system. The method of the present invention includes the steps of: writing multiple files consecutively onto a tape to become one combined file; writing, onto the tape, first index information including the start position and size of the combined file on the tape; and writing, onto the tape, second index information including the start position and size of each of the multiple files in the combined file on the tape.

20 Claims, 4 Drawing Sheets

METHOD OF WRITING FILE ONTO TAPE

BACKGROUND

The present invention relates to a method of writing a file onto a tape, and more specifically to a method of writing a file onto a tape in a file system.

For example, as a mechanism for accessing data in a tape drive as a file in a file system, an LTFS (Linear Tape File System) is in practical use. In the LTFS, meta-information indicating where on a tape a data area constituting the file is, and the like is associated as index information to realize the file system. The mechanism enables direct access from an application program executed on a computer to a file in the tape drive.

The speed of writing data to a tape is determined by the standard of the tape drive. For example, in the case of an LTO-5 tape drive as one of the LTO standards, the data transfer rate is higher than that of normal hard disks. Although the maximum speed thereof when the data is uncompressed is about 140 MB/sec, the time to move the head is added. In addition to that, in the case of an LTFS, since it is necessary to store the above-mentioned index information together with data constituting a file and generate API calls (system calls), namely "open," "write," and "close," for each file unit in the file system, it is noted that the data transfer rate (the speed of writing data to a tape) becomes further lower.

It is pointed out that this problem becomes pronounced particularly when a large number of small-sized files are written onto a tape in the LTFS. For example, as a result of a test in an LTO-6 tape drive, it is found that the data transfer rate (MB/sec) tends to become lower as the file size becomes smaller than 512 KB.

This reduction in transfer rate is considered to be mainly caused by the overhead due to API calls to "open" and "close" a file, the overhead due to updating of index information as a result of adding a file, or the like. Further, since the tape continues to run during interaction from when one file is closed until the next file is opened, the writing speed also needs to be reduced to make coordination, and this causes performance decline as well.

SUMMARY

It is an object of the present invention to improve the speed of data transfer onto a tape in a file system, and more specifically, to propose a mechanism (method) capable of reducing the above-mentioned overhead to enable high-speed writing even when a large number of small-sized files are written onto the tape in the file system.

In one aspect of the present invention, there is provided a method of writing a file onto a tape in a file system. The method includes the steps of: writing multiple files consecutively onto the tape to become one combined file; writing, onto the tape, first index information including the start position and size of the combined file on the tape; and writing, onto the tape, second index information including the start position and size of each of the multiple files in the combined file on the tape.

According to one aspect of the present invention, the multiple files are written consecutively onto the tape to become one combined file, and this can reduce the time of writing data onto the tape, i.e., reduce overhead upon writing. Further, according to one aspect of the present invention, data can be read in units of individual files in the combined file based on the second index information stored on the tape and including the start position and size of each of the multiple files in the combined file on the tape.

In another aspect of the present invention, the method further includes the steps of: acquiring meta-information including the path name, offset position, and size of each of the multiple files included in the combined file; and creating the second index information using the start position of the combined file on the tape and the meta-information.

According to another aspect of the present invention, the second index information can be created using the start position of the combined file on the tape and the meta-information independently of (in parallel with) writing of the file onto the tape. As a result, performance (processing time and the like) upon writing the file onto the tape in the file system can be further improved.

In still another aspect of the present invention, the combined file, the first index information, and the second index information are all written to a data partition of the tape, the first index information is written behind a data area of the combined file, and the second index information is written behind the first index information.

In yet another aspect of the present invention, there is provided a data structure on a tape readable and writable in a tape drive available in a file system. The data structure includes: a combined file area stored in a data partition of the tape and including multiple consecutive files; a first index information area stored behind the combined file area and including the start position and size of the combined file; and a second index information area stored behind the first index information area and including the start position and size of each of the multiple files in the combined file.

DETAILED DESCRIPTION

Figure 1:
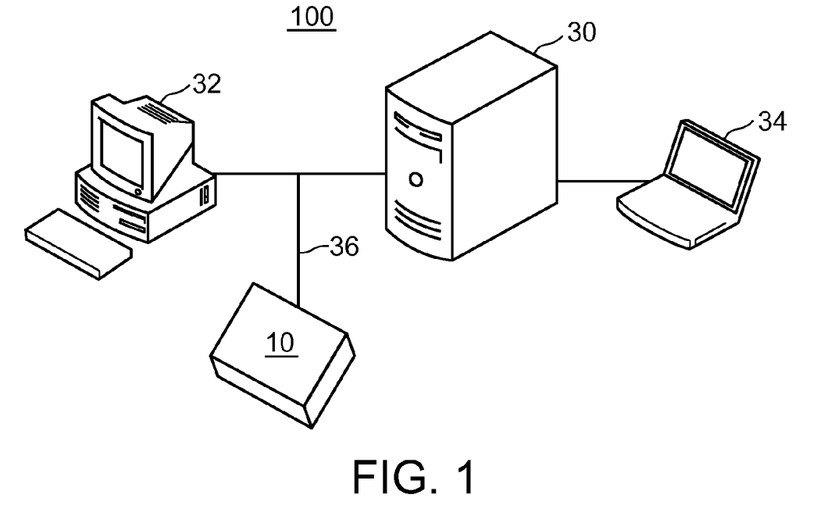
FIG. 1 is a diagram showing a configuration example of a file system in accordance with an embodiment of the present invention.

An embodiment of the present invention will be described with reference to the accompanying drawings. FIG. 1 is a diagram showing a configuration example of a file system in which a method of the present invention is carried out. A file system 100 is made up of a tape drive 10, a host (server) 30, and PCs (terminals) 32, 34, which are communicable with one another through a network 36. The tape drive 10 and the host (server) 30 are each illustrated as one component in FIG. 1, but this is just an example. It goes without saying that two or more tape drives 10 and hosts (servers) 30 can be included.

For example, the file system 100 can be an LTFS. Like an HDD, a USB memory, or any other removable recording medium such as a CD-R, the LTFS can directly access a file stored in a tape cartridge (tape) when the tape cartridge is inserted into the tape drive. To build a file system on a tape drive, the tape drive needs to have partitions (data partition and index partition). The partitions will be further described later. Note that a "file" including various kinds of data may be referred to simply as data to use both in the same meaning ("data"="file") in the following description of this specification.

Figure 2:
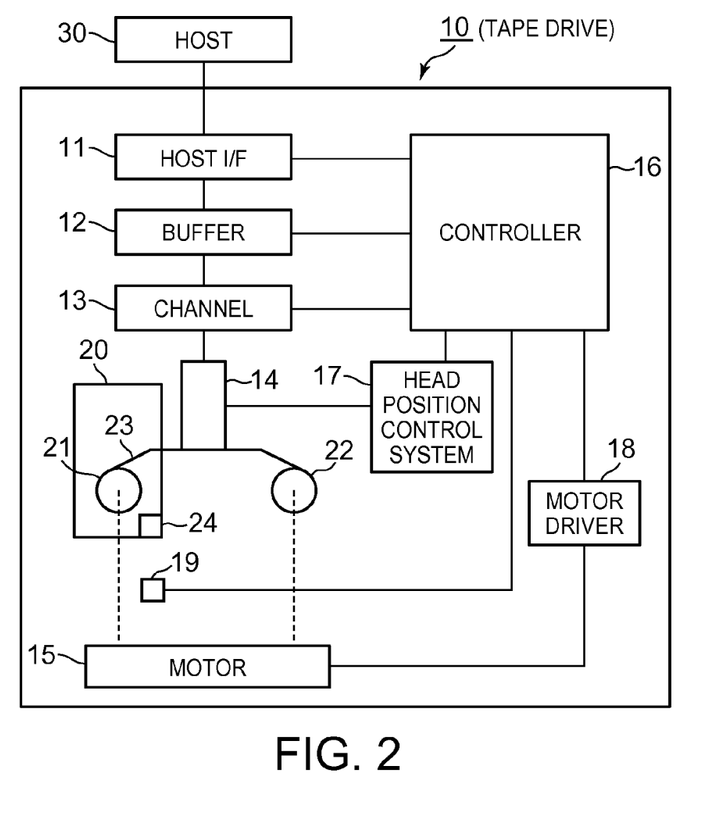
FIG. 2 is a diagram showing a configuration example of a tape drive in accordance with an embodiment of the present invention.

FIG. 2 is a diagram showing a configuration example of the tape drive of the present invention. The tape drive 10 includes a host interface (hereinafter referred to as "host I/F") 11, a buffer 12, a channel 13, a head 14, and a motor 15. The tape drive 10 also includes a controller 16, a head position control system 17, and a motor driver 18. Since a tape cartridge 20 is loadable when the tape cartridge 20 is inserted into the tape drive 10, the tape cartridge 20 is further shown here. This tape cartridge 20 includes a tape 23 wound on reels 21 and 22. The tape 23 moves in a longitudinal direction with the rotation of the reels 21 and 22 from the reel 21 to the reel 22 or from the reel 22 to the reel 21. A magnetic tape is exemplified as the tape 23, but the tape 23 may be any tape medium other than the magnetic tape.

The tape cartridge 20 also includes a cartridge memory (CM) 24. This CM 24 records, for example, information about how data was written on the tape 23. Then, for example, an index of data written on the tape 23 in a noncontact mode using an RF interface or the usage of the tape 23 is checked to enable high-speed access to the data. In FIG. 2, an interface like this RF interface for performing access to the CM 24 is shown as a cartridge memory interface (hereinafter referred to as "CM I/F") 19.

Here, the host I/F 11 performs communication with the host (server) 30 or the other PC 32. For example, the host I/F 11 receives, from an OS of the host 30, a command to instruct writing of data to the tape 23, a command to move the tape 23 to a target position, and a command to instruct reading of data from the tape 23. In the example of the LTFS mentioned above, data within the tape drive can be referred directly from a desktop OS or the like, and a file can be executed by the double click or copied by the drag-and-drop action like a case of handling a file within an HD.

The buffer 12 is a memory for accumulating data to be written to the tape 23 or read from the tape 23. For example, the buffer 12 is made up of a DRAM. Further, the buffer 12 is composed of multiple buffer segments, where each buffer segment stores a dataset as a unit of reading from or writing to the tape 23.

The channel 13 is a communication channel used to send the head 14 data to be written to the tape 23 or to receive, from the head 14, data read from the tape 23. The head 14 writes information to the tape 23 or reads information from the tape 23 when the tape 23 moves in the longitudinal direction. The motor 15 rotates the reels 21 and 22. Although the motor 15 is represented by one rectangle in FIG. 2, it is preferable to provide one motor for each of the reels 21 and 22, i.e., two motors in total.

On the other hand, the controller 16 controls the entire tape drive 10. For example, the controller 16 controls writing of data to the tape 23 and reading of data from the tape 23 according to the commands accepted at the host I/F 11. The controller 16 also controls the head position control system 17 and the motor driver 18. The head position control system 17 is a system for keeping track of a desired wrap. Here, the wrap means a group of multiple tracks on the tape 23. When it is necessary to switch from one wrap to another, the head 14 also needs to be electrically switched. Such switching is controlled by this head position control system 17.

The motor driver 18 drives the motor 15. As mentioned above, if two motors 15 are used, two motor drivers 18 will also be provided. The CM I/F 19 is, for example, implemented by an RF reader/writer to write information to the CM 24 and read information from the CM 24.

Figure 3:
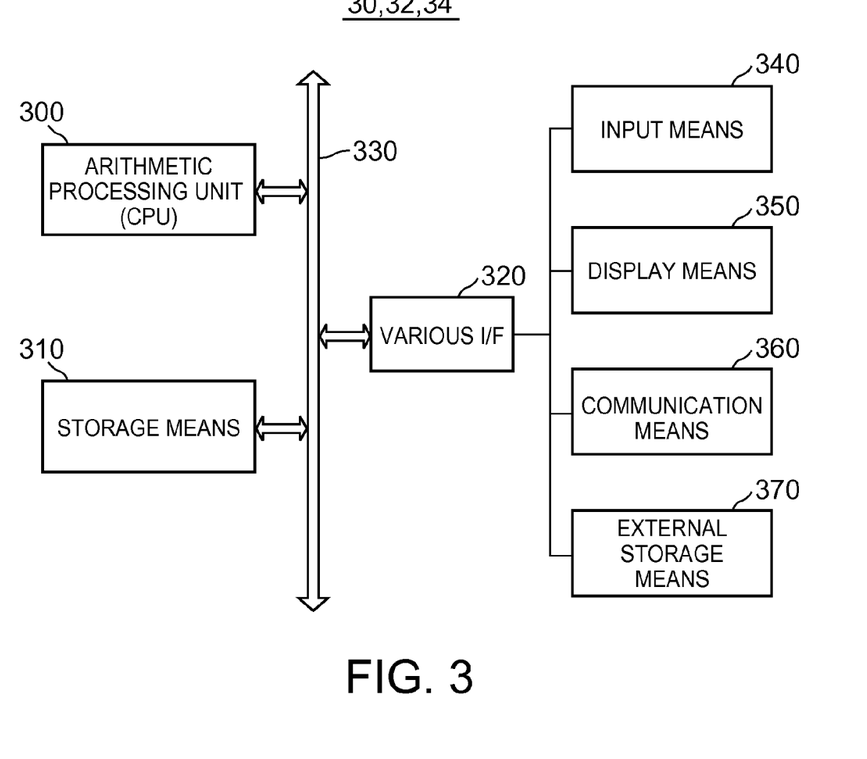
FIG. 3 is a block diagram showing a configuration example of a host (server) and PCs in accordance with an embodiment of the present invention.

FIG. 3 is a block diagram showing a configuration example of the host (server) 30 and the PCs (terminal) 32, 34 in FIG. 1. The host (server) or each terminal includes an arithmetic processing unit (CPU) 300, storage means 310, and various I/F 320 connected to one another through a bus 330.

The various I/F 320 is used as a generic term that includes an input I/F, an output I/F, an external storage I/F, an external communication I/F, and the like. Each I/F is connected to corresponding means, namely input means 340 such as a touch keyboard, a touch panel, or a keyboard, display means 350 such as an LCD, wireless or wired communication means 360, external storage means 370 such as a semiconductor memory through a USB connection or an HDD, or the like. The storage means 310 can include semiconductor memories, such as a RAM, a ROM, and a flash memory, and an HDD.

Figure 4:
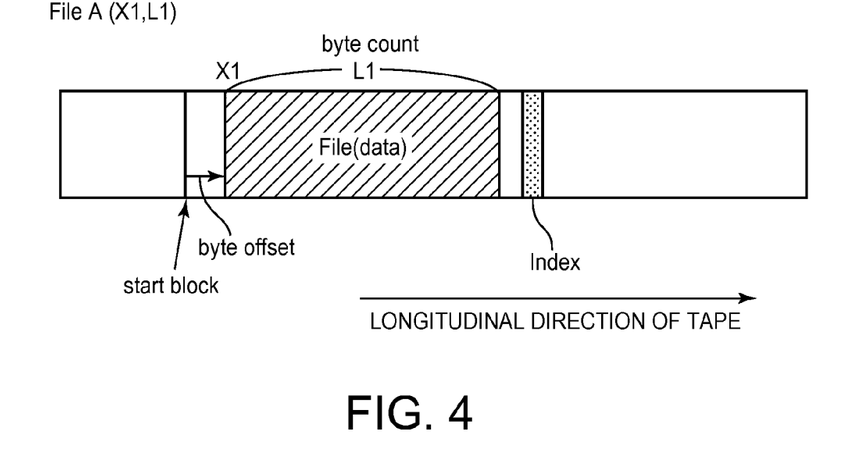
FIG. 4 is a diagram showing a structure example (data structure) of a conventional data partition in accordance with an embodiment of the present invention.

Referring to FIG. 4, the structure of a partition and an index in an LTFS in which the present invention is carried out will be described. In the LTFS, logical blocks on a tape, which are called partitions and the support of which is started from the LTO-5, are used. There are two types of partitions, namely an index partition and a data partition. The data partition is composed of data constituting a file, and index information to be written when certain conditions are met after completion of writing the file. In the index partition, the latest index information is stored and read when a cartridge is loaded so that it can be determined in which position on a medium the data constituting the file exists.

FIG. 4 shows a structure example of the data partition. In FIG. 4, one file A is made up of data and an associated index. In some parts of the index, there are a partition ID, a start block, a byte offset, a byte count, and a file offset as elements constituting the file, and these elements are collectively called an extent. The content of each element is as follows. In the following description, data constituting one file is called data or a data area. Further, information on a data area included in the index is called index information or meta-information.

Partition ID: A logical ID assigned to the data partition and/or the index partition. Although two or more IDs can be contained, only one data partition is used in existing LTFSs. Therefore, the partition ID is consistently unique.

Start block: An indication of the number of a block in which a leading part of data constituting the file is included, where the concept of block is used to indicate the position of data on the tape, and the size of one block is set to 512 KB by default.

Byte offset: An offset indicating where the head position of data starts on the block.

Byte count: An indication of the number of bytes that constitute the data.

File offset: An indication of where a data area constituting this extent is located in the entire file.

In the index information of the LTFS, when a file is written onto a tape, the entire file is written as one extent. This enables the next reading of the file efficiently with one access. Here, as illustrated in FIG. 4, the partition ID that exists as only one is not written for the sake of simplicity, and a file starting position obtained from the start block and the byte offset is denoted as X1 and the number of bytes that constitute data is denoted as L1. As a result, the data area of the file A can be represented as (X1, L1) as index information.

Figure 5:
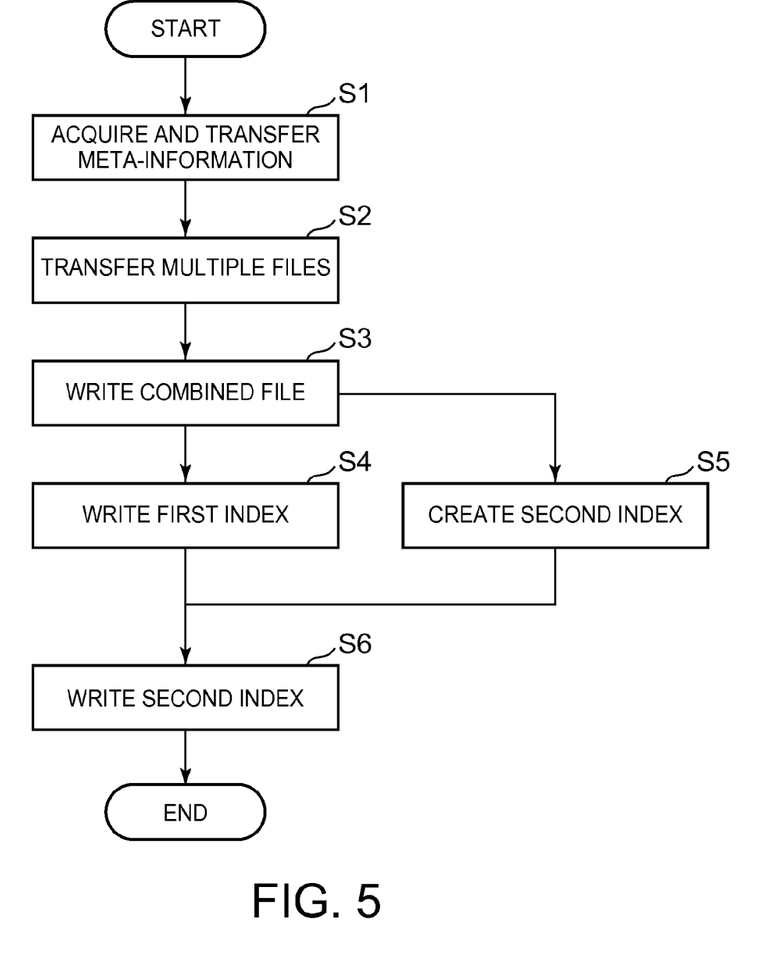
FIG. 5 is a chart showing a flow of a method in accordance with an embodiment of the present invention.

Referring to FIG. 5, a flow of a method of the present invention to write a file onto a tape will be described. The flow of FIG. 5 is executed in the file system 100 in FIG. 1, and more specifically, it is executed by software executed on the host (server) 30, the PC (terminal) 32, 34, or in the tape drive 10. Note that the following will mainly describe the embodiment in the LTFS, but the method of the present invention is not limited to this embodiment.

In step S1, the path information, the offset position, and the meta-information including each size are acquired for each file in order of multiple files to be stored on the tape in the tape drive 10. For example, when the LTFS copy tool is used, this step is executed as follows.

The order of all files to be copied is decided. When the files are copied from tape to tape (tape to tape), the order of the files to be copied is decided from the positions of source files on the tape, while when the files are copied from the HDD to a tape (disk to tape), the order does not matter.

The path name of each individual file when all the files are combined, the offset position from the top, and the size of the file are acquired for all the files, and notified to the LTFS. This notification makes the LTFS recognize the start of writing the files by the method of the present invention.

Figure 6:
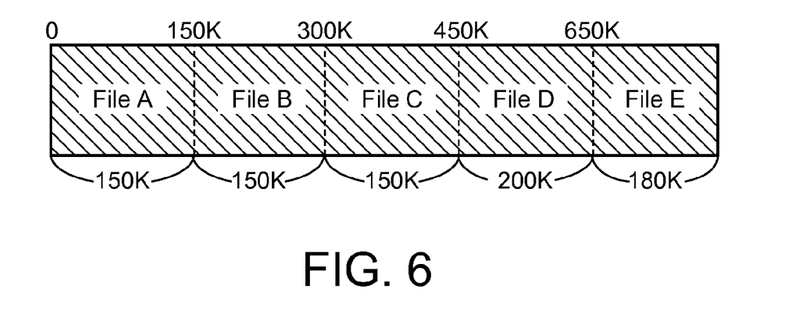
FIG. 6 is a diagram showing an example of multiple files combined in the method in accordance with an embodiment of the present invention.

The notified meta-information of each file including path information, offset position, and size is made up as follows. Here, an example in which five files, i.e., Files A to E in FIG. 6 are copied is shown.

File A, 0, 150 KB: Here, the file path, the offset position, and the file size are listed in this order.
   File B, 150 KB, 150 KB: Same as above.
   abc/File C, 300 KB, 150 KB: The file name is specified by a relative path. This relative path is a relative path from a folder from which the file name is copied.
   abc/File D, 450 KB, 200 KB: Same as above.
   temp/File E, 650 KB, 180 KB: Same as above.

Returning to FIG. 5, the multiple files to be stored in the tape drive 10 are transferred to the tape drive 10 in the next step S2. When the LTFS copy tool is used, the multiple files to be copied are read in order from the sources, written by the block size to a buffer in the memory closely in order from the top, and transferred by the block size from the sources to the tape drive 10.

In step S3, the tape drive 10 writes, onto the tape, one file (combined file) composed of the received multiple files. For example, when the LTFS copy tool is used, this step is executed as follows.

(4) The file is opened by the API of the file system to write the file.
   (5) Using an identifier (such as a file descriptor or a FILE pointer) when the file is opened, data constituting the file are written by the block. When the file size is smaller than the block size, the combined file may be able to be written collectively in one block at one time. This operation is the same as the case of normal file writing.
   (6) When the file is still to be continued, the procedure proceeds to the above (5).
   (7) When there is a file to be written next, the above (5) and (6) are repeated for the file.
   (8) The file is closed.

Figure 7A:
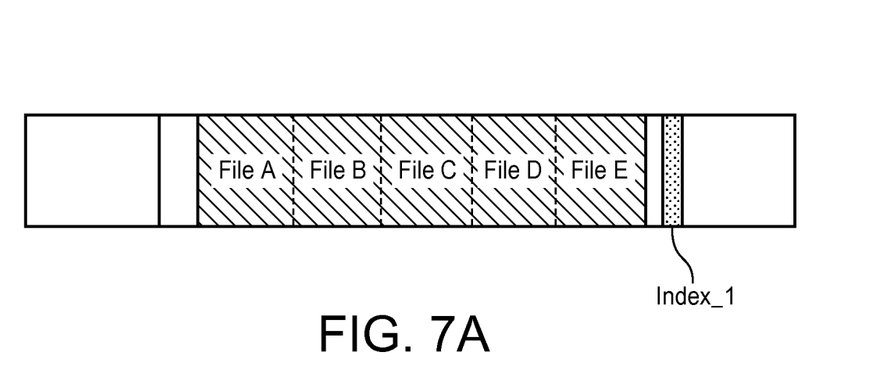
FIG. 7A-7B contain diagrams showing an example (data structure) of the storage of files in a data partition used in an embodiment of the present invention.

In step S4, the tape drive 10 writes, onto the tape, the first index information including the start position and size of the combined file on the tape written in step S3. FIG. 7A shows an example in which this first index information Index_1 is written in step S4 after the five files, i.e., Files A to E shown in FIG. 6 are written to become one combined file. In the example of FIG. 7A, the first index information Index_1 includes information on at least "0" as the start position of the combined file (offset position) and "830 KB" that is a total value of the five files as the file size. As shown, the first index information Index_1 is written behind the data area of the combined file.

In step S5, second index information including the file path, the start position, and the file size is created for each of the multiple files in the combined file on the tape by using the meta-information acquired in step S1 and the start position of the combined file obtained in step S3. When the first block number is decided by the first file writing, the second index information can be constructed from the meta-information acquired in step S1 independently of the writing to the tape drive. During the writing to the tape drive in step S3, much load is not imposed on the system on the host 30 side. Therefore, the index can be created in parallel with the writing in step S3. For example, when the LTFS copy tool is used, this step is executed as follows.

(9) A new thread for creating the second index information is created. The thread is kept to be able to receive a notification from a source thread.
   (10) The source thread for writing onto the tape has a cache therein, where data written from an application are stored in the cache, and when reaching a certain condition, the source thread collectively writes the data from the cache to a medium. The first block is written, and when the block position is decided, the first block number is notified to the index creation thread started at the above (9).
   (11) When the index creation thread receives the notification, the creation of the entity of directory information (which is independent of actual directory information here) from the meta-information acquired in step S1 is started. Simultaneously, an index file in an xml format is created from this directory information. The created index file is stored in the storage means (memory) 310 or on the external storage means (disk) 370. In this example, inter-thread communication is performed. However, if the thread is created in step S5 after the first block of a file to be written first in step S3 is decided, it can be achieved without performing inter-thread communication.

The index file (second index information) in the xml format at the above (11) is created as a new index based on the meta-information notified in step S1 and the first index information on the combined file in step S3. For example, it is assumed that the file created in step S3 is written from offset y of x block on the tape. It is then assumed that b bytes from offset a of the file notified in step S1 as the meta-information is file A. In this case, the file A becomes a b-byte file starting from the (y+a) % k-th byte of block x+(y+a)/k. Here, k is the block size when the LTFS writes data to a medium. Further, % denotes a residue.

Specifically, for example, this step is as follows. It is assumed that, when the block size is 512 KB, a file is written in step S3 from offset 400 KB of block 10. At this time, it is assumed that the File D illustrated in FIG. 6 is the 200 KB file written from offset 450 KB. This File D is recorded in the index as the 200 KB file starting from offset 338 KB of block 11, i.e., as being composed of data up to offset 26 KB of block 12.

Figure 7B:
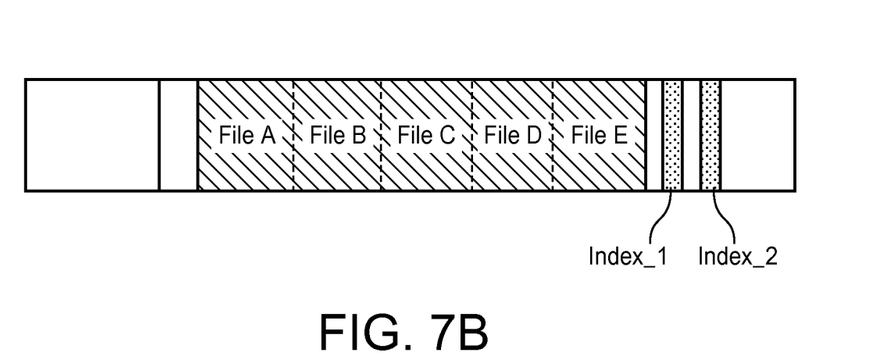

In the next step S6, the tape drive 10 writes, onto the tape, the second index information created in step S5. FIG. 7B shows an example in which the second index information Index_2 is written in step S5 after the first index information Index_1 is written onto the tape. As shown, the second index information Index_2 is written behind the first index information Index_1. Note that the second index information may be written over the first index information.

The embodiment of the present invention has been described with reference to the accompanying drawings. However, the present invention is not limited to the embodiment. Further, the present invention can be carried out in other modes to which various improvements, modifications, and variations are added based on the knowledge of those skilled in the art without departing from the scope of the present invention.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method of writing a file onto a tape, comprising the steps of:
    writing, by a computer, wherein the computer utilizes a Linear Tape File System, a plurality of files consecutively onto the tape to become one partition free combined file, wherein the each file of the plurality of files directly abuts to the previously written plurality of files to create a buffer free combined file;
    creating, by a computer, onto the tape, a partition between the combined file and a subsequently written first index;
    writing, by a computer, onto the tape, a first index information including a start position and a size of the combined file on the tape;
    creating, by a computer, onto the tape, a partition between the first index and a subsequently written second index; and
    writing, by a computer, onto the tape, the second index information, wherein the second index information is unique from the first index information, including a start position and a size of each of the plurality of files in the combined file on the tape, wherein the second index information is obtained via acquiring meta-information.

2. The method according to claim 1, wherein acquiring meta-information comprises:
    acquiring meta-information including a path name, an offset position, and a size of each of the plurality of files included in the combined file; and
    creating the second index information using the start position of the combined file on the tape and the meta-information.

3. The method of claim 1, further comprising:
    wherein acquiring meta-information comprises:
        acquiring meta-information including a path name, an offset position, and a size of each of the plurality of files included in the combined file, wherein the step of acquiring the meta-information includes a step of deciding on an order of files in the plurality of files to be stored; and
        creating the second index information using the start position of the combined file on the tape and the meta-information;
    the combined file, the first index information, and the second index information are all written to a data partition of the tape, wherein the second index information is written in parallel with the writing of the file onto the tape;
    the first index information is written behind the combined file, and the second index information is written behind the first index information;
    wherein the file is written onto the tape in a file system;
    wherein a second combined file is written onto the tape in a tape drive; and
    wherein the second index information is written over the first index information.

4. The method according to claim 2, wherein the step of acquiring the meta-information includes a step of deciding on an order of files in the plurality of files to be stored.

5. The method according to claim 1, wherein:
    the combined file, the first index information, and the second index information are all written to a data partition of the tape, and
    the first index information is written behind the combined file, and the second index information is written behind the first index information.

6. The method according to claim 1, wherein the file is written onto the tape in a file system.

7. The method according to claim 1, wherein the file is written onto the tape in a tape drive.

8. The method according to claim 1, wherein the second index information is written over the first index information.

9. A computer program product for writing a file onto a tape, the computer program product comprising a computer readable storage medium having program instructions embodied therewith, the program instructions executable by a computer to cause the computer to:
    write, wherein the computer utilizes a Linear Tape File System, a plurality of files consecutively onto the tape to become one partition free combined file, wherein the each file of the plurality of files directly abuts to the previously written plurality of files to create a buffer free combined file;
    create onto the tape, a partition between the combined file and a subsequently written first index;
    write onto the tape, first index information including a start position and a size of the combined file on the tape;
    create onto the tape, a partition between the first index and a subsequently written second index; and
    write onto the tape, the second index information, wherein the second index information is unique from the first index information, including a start position and a size of each of the plurality of files in the combined file on the tape, wherein the second index information is obtained via acquiring meta-information.

10. The computer program product according to claim 9, wherein acquiring meta-information comprises program instructions executable by a computer to cause the computer to:

acquire meta-information including a path name, an offset position, and a size of each of the plurality of files included in the combined file; and create the second index information using the start position of the combined file on the tape and the meta-information.

11. The computer program product according to claim 10, wherein the program instructions to acquire the meta-information include program instructions to decide on an order of files in the plurality of files to be stored.

12. The computer program product according to claim 9, wherein:

the combined file, the first index information, and the second index information are all written to a data partition of the tape, and the first index information is written behind the combined file, and the second index information is written behind the first index information.

13. The computer program product according to claim 9, wherein the file is written onto the tape in a file system.

14. The computer program product according to claim 9, wherein the file is written onto the tape in a tape drive.

15. The computer program product according to claim 9, wherein the second index information is written over the first index information.

16. A computer system for writing a file onto a tape, the computer system comprising:

one or more computer processors;

one or more computer readable storage media;

program instructions stored on the one or more computer readable storage media for execution by at least one of the one or more computer processors, the program instructions comprising:

program instructions to write, wherein the computer utilizes a Linear Tape File System, a plurality of files consecutively onto the tape to become one partition free combined file, wherein the each file of the plurality of files directly abuts to the previously written plurality of files to create a buffer free combined file;

program instructions to create onto the tape, a partition between the combined file and a subsequently written first index;

program instructions to write onto the tape, first index information including a start position and a size of the combined file on the tape;

program instructions to create onto the tape, a partition between the first index and a subsequently written second index; and program instructions to write onto the tape, the second index information, wherein the second index information is unique from the first index information, including a start position and a size of each of the plurality of files in the combined file on the tape, wherein the second index information is obtained via acquiring meta-information.

17. The computer system according to claim 16, wherein acquiring meta-information comprises program instructions to:

acquire meta-information including a path name, an offset position, and a size of each of the plurality of files included in the combined file; and create the second index information using the start position of the combined file on the tape and the meta-information.

18. The computer system according to claim 17, wherein the program instructions to acquire the meta-information include program instructions to decide on an order of files in the plurality of files to be stored.

19. The computer system according to claim 16, wherein:

the combined file, the first index information, and the second index information are all written to a data partition of the tape, and the first index information is written behind the combined file, and the second index information is written behind the first index information.

20. The computer system according to claim 16, wherein the file is written onto the tape in a tape drive.

* * * * *